United States Patent
Christ

(10) Patent No.: US 12,303,884 B2
(45) Date of Patent: May 20, 2025

(54) MICROSCOPE FOR MICROSCOPIC EXAMINATION OF A SAMPLE

(71) Applicant: Leica Microsystems CMS GmbH, Wetzlar (DE)

(72) Inventor: Stefan Christ, Schoeffengrund (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 1015 days.

(21) Appl. No.: 17/343,837

(22) Filed: Jun. 10, 2021

(65) Prior Publication Data

US 2022/0001380 A1    Jan. 6, 2022

(30) Foreign Application Priority Data

Jul. 3, 2020   (EP) .................................. 20184081

(51) Int. Cl.
   *B01L 3/00*       (2006.01)

(52) U.S. Cl.
   CPC .......... *B01L 3/502* (2013.01); *B01L 2200/16* (2013.01); *B01L 2300/042* (2013.01); *B01L 2300/1822* (2013.01); *B01L 2300/1894* (2013.01)

(58) Field of Classification Search
   CPC ................ G02B 21/00; G02B 21/0004; G02B 21/0088; G02B 21/24; G02B 21/28; G02B 21/30; B01L 3/502; B01L 2200/16; B01L 2300/042; B01L 2300/1822; B01L 2300/1894; B01L 1/00; B01L 3/50273; B01L 3/52; B01L 3/523; B01L 3/527; B01L 7/00; B01L 7/04; B01L 7/52; B01L 2300/18; B01L 2300/1805
   USPC ............... 359/395, 362, 368, 391, 396, 398; 435/283.1, 287.1, 287.3, 288.1, 288.3, 435/288.5, 288.7; 436/164, 172
   See application file for complete search history.

(56) References Cited

U.S. PATENT DOCUMENTS

| | | | |
|---|---|---|---|
| 6,673,620 B1* | 1/2004 | Loeffler | G02B 21/26 422/537 |
| 9,810,704 B2* | 11/2017 | Holmes | G01N 21/25 |
| 11,865,534 B2* | 1/2024 | Walsh | A61B 5/150221 |
| 2017/0022537 A1* | 1/2017 | Stock | C12Q 1/66 |

FOREIGN PATENT DOCUMENTS

JP    2007 140155 A    6/2007

* cited by examiner

*Primary Examiner* — Arnel C Lavarias
(74) *Attorney, Agent, or Firm* — LEYDIG, VOIT & MAYER, LTD.

(57) ABSTRACT

A microscope for microscopic examination of a sample includes: a microscope housing enclosing an illumination optics, a microscope stage, and an imaging optics; an integrated sample chamber located within the microscope housing; and an integrated reagent chamber located within the microscope housing, the integrated reagent chamber supplying a reagent to the sample.

16 Claims, 7 Drawing Sheets

MICROSCOPE FOR MICROSCOPIC EXAMINATION OF A SAMPLE

CROSS-REFERENCE TO PRIOR APPLICATION

Priority is claimed to European Patent Application No. EP 20184081.6, filed on Jul. 3, 2020, the entire disclosure of which is hereby incorporated by reference herein.

FIELD

The present inventive concept is directed to a microscope for microscopic examination of a sample, particularly for examination of a sample to be located in a sample chamber where a reagent is to be supplied to the sample before or during examination of the sample.

BACKGROUND

Especially in the field of microscopic examination of living samples like cells, it is common practice to supply a reagent to the sample before microscopic examination of the sample. A reagent in the meaning of the present application encompasses any fluids, in particular liquids with or without chemically or biologically active substances, e.g. water, water-soluble or fat-soluble or other substances like hormones or medicine in a suitable carrier substance for triggering biological or chemical reactions with the sample or just for preserving the sample. Usually, the sample itself is located in multi-well-plates, Petri dishes or microfluidic systems on a microscope table. Pumps are used for supplying the reagent to the sample. Syringe pumps are often used for injection processes and peristaltic pumps are used for continuously conveying a reagent, for example for supplying a reagent to a sample and simultaneously removing reagent from the sample. On the other hand, manual pipetting can be carried out.

Various kinds of containers, like Falcon tubes or Eppendorf tubes or Schott flasks, are used for storing the reagent. The containers are typically located outside the microscope housing, sometimes in a temperature controlled box. One or more pump systems are used for transporting reagent from a container to the sample, the pump system typically being either located outside the microscope housing or inside the microscope housing. Temperature controlled boxes for storage of reagent containers typically include heating elements or ice baths.

In many cases, only small amounts of a reagent need to be injected into a biological sample and the reagent has to be stored in a light protected container at a temperature below ambient temperature, for example at 4 to 8° C. This especially applies to the injection of stimulants, like hormones or medicine drugs, in 3D-cell-culture experiments. Supplying the reagent through long supply lines makes it difficult to keep the reagent light protected and at a certain temperature on its way to the sample. Further, a lot of fluid is needed to compensate for the dead volume inside the tubing, which in turn generates higher costs for the chemicals in use.

On the other hand, larger amounts of reagent need to be exchanged for example in organ-on-a-chip experiments. Injection of larger amounts of reagent or linking of a peristaltic pump system is often cumbersome and—due to differences in temperature of the reagent to be injected and the sample to be examined—can result in temperature dependent measurement artefacts and even in a dieback of the sample during the experiment. Thus, ideally, the temperature of the reagent to be injected should be the same as the temperature of the sample.

SUMMARY

In an embodiment, the present invention provides a microscope for microscopic examination of a sample, comprising: a microscope housing enclosing an illumination optics, a microscope stage, and an imaging optics; an integrated sample chamber located within the microscope housing; and an integrated reagent chamber located within the microscope housing, the integrated reagent chamber being configured to supply a reagent to the sample.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
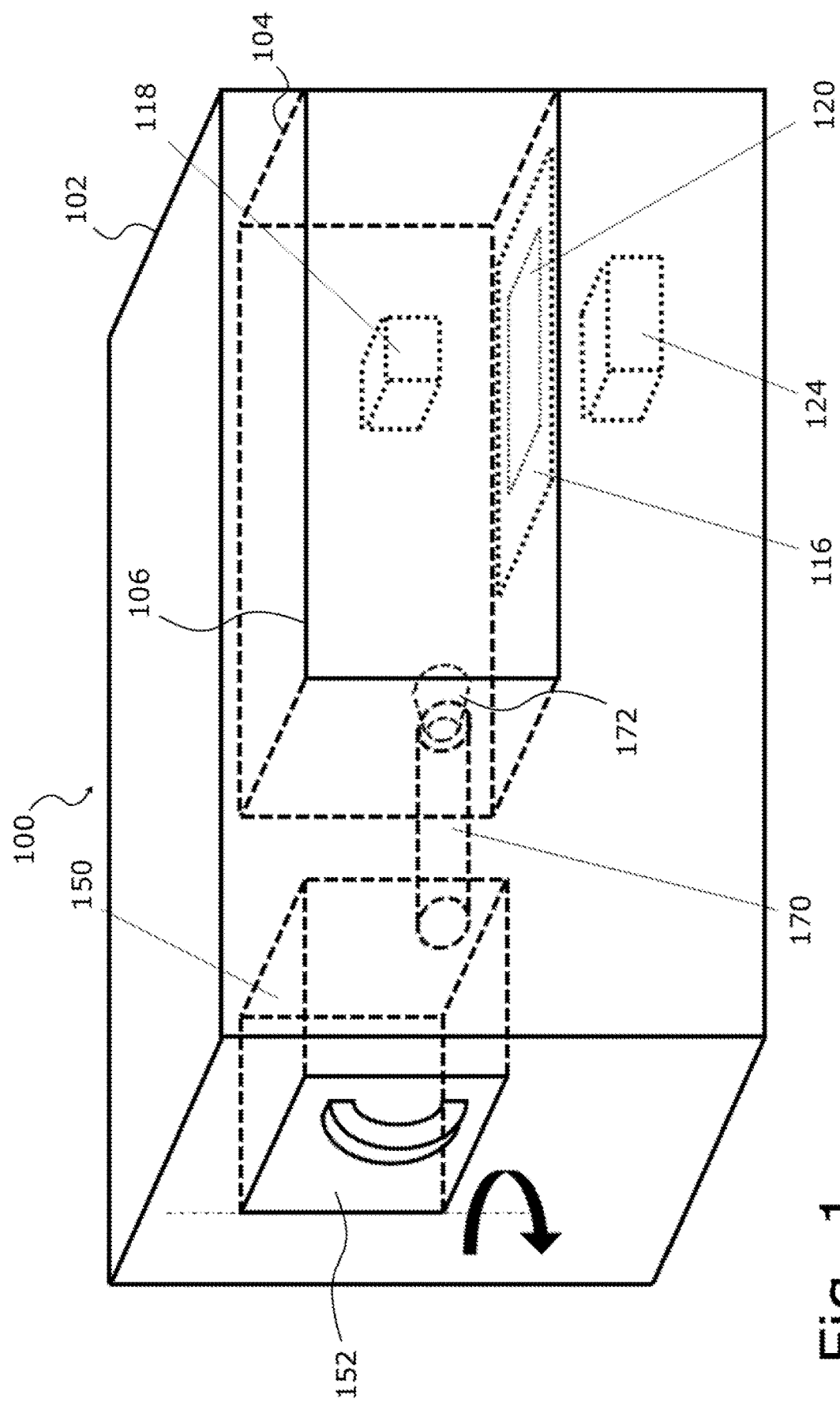
FIG. 1 schematically shows a first embodiment of a microscope including a reagent chamber located outside the sample chamber of the microscope.

In view of the drawbacks described above, there is a need for an improved solution for supplying reagents to a sample which is examined in a microscope.

Embodiments of present inventive concept provide a microscope for microscopic examination of a sample as described herein. The microscope comprises a microscope housing enclosing an illumination optics, a microscope stage and an imaging optics, and further an integrated sample chamber located within the microscope housing. Further, an integrated reagent chamber is located within the same microscope housing and configured to supply a reagent to the sample.

The present inventive concept can thus provide a microscope including an integrated reagent chamber which is located together with the integrated sample chamber within the same microscope housing. This solution allows minimum distances between a reagent container and the sample. At the same time, the reagent can be conveyed and stored in a light protected manner and with little or no temperature fluctuation. Another advantage is that reagent can be supplied to the sample before and/or during examination without the need of accessing the sample by a user.

It should be noted that the reagent chamber according to the present inventive concept is configured to supply a reagent to the sample. This means that the required reagent containers which may also be buffer containers and, preferably, the associated pump systems together with the corresponding reagent supply lines can be installed in or are part of the reagent chamber.

In a preferred embodiment, the reagent chamber itself is light protected and/or thermally insulated. In this embodiment, ambient atmosphere exerts minimum influence on the reagent inside the reagent chamber.

There are two alternatives for locating the integrated reagent chamber within the microscope housing, namely the reagent chamber can be located outside or inside the sample chamber.

In case the reagent chamber is located outside the sample chamber, the reagent chamber comprises a connecting tube connecting the reagent chamber with the sample chamber. As the reagent chamber and the sample chamber in this embodiment represent separated entities, it is highly preferable that the reagent chamber including the connecting tube is thermally insulated. In a preferred embodiment, the reagent chamber contains at least one reagent container and a pump system for conveying the reagent from the reagent container through at least one reagent supply line to the sample located within the sample chamber. The at least one supply line and/or any reagent removal lines extend through the connecting tube.

In a preferred embodiment, the connecting tube comprises a plug at at least one of its ends for (at least) partly closing the respective tube end. The plug, for example, is inserted into the end of the connecting tube facing the sample chamber. The plug is formed such that any supply/removal lines can still extend through the plug through corresponding through holes. Such a plug serves the purpose of defining predetermined positions of the supply/removal lines and of providing a high thermal insulation and of preventing sample chamber atmosphere entering the reagent chamber.

According to the second alternative, the reagent chamber is located within the sample chamber. This embodiment is especially preferred in cases where the sample chamber provides enough space for accommodating the reagent chamber. Mostly, especially in the case of biological samples, the sample chamber is incubated, i.e. temperature and incubation atmosphere composition within the sample chamber are controlled. In such cases it might not be necessary to use a thermally insulated reagent chamber as the temperature of the non-insulated reagent chamber will approach the temperature of the incubated sample chamber. Nevertheless, it is preferred if the reagent chamber comprises an opening at least partly closed by a plug. As already explained above in connection with the first alternative, the plug can serve the purpose of determining a defined position of any supply/removal lines. Further it increases the insulation efficiency of an insulated reagent chamber. Finally, it avoids that the incubation atmosphere enters the interior of the reagent chamber.

It should be noted that there are cases where a stage top chamber is used which is placed within the sample chamber onto the microscope stage and which is configured to receive the sample. In such cases, only the very small volume of the stage top chamber is incubated. In these cases, the reagent supply line has to be connected to the stage top chamber such that reagent is supplied to the sample within the stage top chamber. Equally, a reagent removal line has to be connected to the stage top chamber such that reagent can be removed from the sample, e.g. back to the reagent chamber.

In another preferred embodiment of the microscope, the integrated sample chamber is formed by a separated housing section within the microscope housing. This housing section forming the sample chamber comprises a lid providing direct access to the microscope stage for placing the sample in the sample chamber. Further, the integrated reagent chamber can be formed by another separated housing section within said microscope housing, this further housing section comprising another door providing direct access to the at least one reagent container and/or the pump system. By opening the door, a user can refill a reagent container, exchange a reagent container, exchange or adjust the pump system, and connect a reagent supply/removal line.

In another preferred embodiment, the housing section forming the sample chamber is configured such that, when the lid is closed, the sample chamber is sealed. This is especially advantageous if the reagent chamber is located within the sample chamber and if the sample chamber is incubated. By using a non-insulated reagent chamber, the temperature in the sample chamber and in the reagent chamber will average out such that no temperature difference exists between the reagent and the sample.

In another preferred embodiment, the housing section forming the sample chamber encloses the illumination optics of the microscope and, at least partly, the microscope stage. Such a configuration corresponds to an inverse transmitted-light microscope. Still another housing section may enclose the imaging optics of the microscope.

In a preferred embodiment, the reagent chamber is configured to be temperature controlled. It is especially useful to temperature control the reagent chamber if the reagent chamber is thermally insulated. This allows to maintain a predefined temperature within the reagent chamber such that any reagent in a container, a supply line or a pump can be kept at a desired temperature. Generally, it might be expedient to configure any of said housing sections, namely the sample chamber, the reagent chamber and the section enclosing the imaging optics, to be air-conditioned or incubated and/or temperature-controlled.

In regard to a possible incubation of the sample chamber, it is preferred if the housing section forming the sample chamber comprises an interface for connection of an external incubation environment conditioning unit to the sample chamber. This allows the environmental conditions in the sample chamber to be controlled when the external incubation environment conditioning unit is connected to the interface. Typically, the incubation environment conditioning unit comprises a connection for supplying $H_2O$, a connection for discharging $H_2O$ and/or incubation atmosphere, a connection for supplying Na and/or $O_2$, and a connection for supplying $CO_2$ into the sample chamber. A desired incubation atmosphere is achieved by controlling at least one of a flow rate and a temperature and content of $H_2O$ and/or $CO_2$ and/or $N_2$ and/or $O_2$ of the incubation atmosphere supplied into the sample chamber.

Temperature control of the reagent chamber can be achieved by at least one of a cooling unit, a heating unit and a heat exchanging unit located within the reagent chamber. Preferably, a Peltier element can be used as a cooling and heating unit. On the other hand, the cooling unit can simply be a coolpack located within the reagent chamber. Also, a heat exchanger can be used for heating or cooling the atmosphere within the reagent chamber against a heat transfer medium in the heat exchanger.

In another embodiment, the reagent chamber is connected to a temperature control unit configured to control a temperature inside the reagent chamber. The temperature control unit can be located outside, e.g. next to the reagent chamber with an atmosphere connecting tube for exchanging atmosphere between the temperature control unit and the reagent chamber. To this end, it is preferred if the temperature control unit comprises at least one fan for circulating heated or cooled atmosphere between the temperature control unit and the reagent chamber. Again, a cooling unit, a heating unit and/or a heat exchanging unit can be provided in the temperature control unit for achieving a desired temperature of the atmosphere exchanged between the temperature control unit and the reagent chamber.

As already discussed above, in a preferred embodiment, the reagent chamber is configured such that at least one reagent container can be installed in the reagent chamber. In operation, the microscope includes a reagent chamber comprising at least one reagent container. Further, it is preferred that the reagent chamber is configured such that at least one of a reagent supply line and a reagent removal line can be connected to one of the at least one reagent container. Again, in operation of the microscope, the reagent chamber comprises at least one of a reagent supply line and a reagent removal line connected to a reagent container. In case of more than one reagent container, a plurality of supply/removal lines can be present.

In a preferred embodiment, the plug in the connecting tube in the first alternative, or the plug at the opening of the reagent chamber in the second alternative, is configured to duct a reagent supply line and/or a reagent removal line through the plug.

Further, the reagent chamber preferably comprises a pump system for conveying reagent through the reagent supply and/or removal line(s). The pump system may comprise a syringe pump and/or a peristaltic pump.

Finally, it is preferred that the reagent chamber comprises a door providing access into the reagent chamber.

It should be noted that features of the above examples and embodiments as well as of the examples and embodiments explained further below can—wholly or in part—be combined to other examples and embodiments not explicitly mentioned herein, nevertheless being part of the present disclosure.

FIG. 1 schematically shows an embodiment of a microscope according to the present inventive concept. A microscope 100 for microscopic examination of a sample 120 comprises a microscope housing 102 enclosing an illumination optics 118, a microscope stage 116 and an imaging optics 124. An integrated sample chamber 106 is located within the microscope housing 102. The configuration shown in FIG. 1 corresponds to an inverse transmitted-light microscope wherein the sample 120 is illuminated by the illumination optics 118 and light transmitted through the sample 120 is detected by the imaging optics 124. In a preferred embodiment, the sample chamber 106 is formed by a separated housing section 104 within the microscope housing 102. Typically, the sample chamber 106 is incubated in order to maintain a desired incubation atmosphere and temperature during examination of the sample 120.

In the embodiment shown in FIG. 1, the reagent chamber 150 is located outside the sample chamber 106 and comprises a connecting tube 170 connecting the reagent chamber 150 with the sample chamber 106. The reagent chamber 150 is located within the microscope housing 102 and is configured to supply a reagent to the sample 120. The reagent chamber can be formed by another housing section of the microscope housing 102. The reagent chamber 150 comprises a door 152 providing direct access into the reagent chamber 150 by a user of the microscope 100. The connecting tube 170 comprises a plug 172 at the end of the connecting tube 170 facing the sample chamber 106. The plug 172 partly closes the respective tube in order to prevent incubation atmosphere from entering the reagent chamber 150. It is preferred, especially in the configuration shown in FIG. 1, if the reagent chamber 150 including the connecting tube 170 is thermally insulated and light protected. This allows to preserve the reagents located in the reagent chamber and to maintain a desired temperature within the reagent chamber 150.

Figure 2:
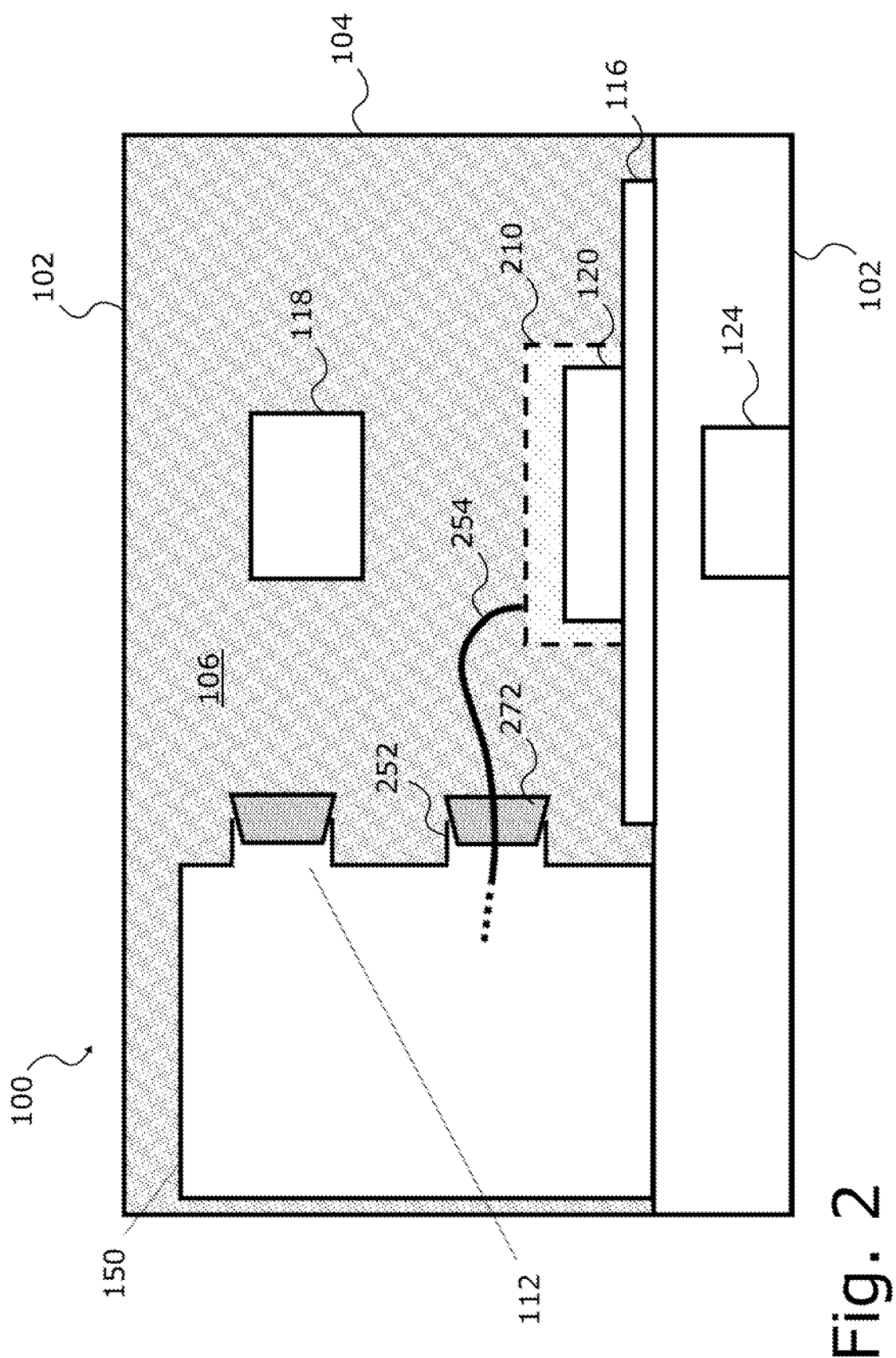
FIG. 2 schematically shows a further embodiment of a microscope including a reagent chamber located inside the sample chamber of the microscope.

FIG. 2 schematically shows another embodiment of a microscope according to the present inventive concept. As can be seen in FIG. 2, the reagent chamber 150 is integrated into the sample chamber 106 within the microscope housing 102. The sample chamber 106, in this embodiment, is formed by a separated housing section 104 of the microscope housing 102. In this housing section 104, there is located the illumination optics 118 and a part of the microscope stage 116 for carrying the sample 120. In another housing section below housing section 104, the imaging optics 124 is located. As in the embodiment in FIG. 1, the microscope of FIG. 2 is an inverse transmitted-light microscope. It should be noted, however, that the present inventive concept is not limited to this type of microscope.

In the embodiment shown in FIG. 2, the sample 120 is located within a stage top chamber 210 which is placed onto the microscope stage 116. Depending on the kind of experiment, the sample 120 may be placed directly onto the microscope stage 116 without such a stage top chamber 210. When using a stage top chamber 210, it is expedient not to incubate the whole sample chamber 106 but only the small volume of the stage top chamber 210.

The reagent chamber 150, in the embodiment shown in FIG. 2, is formed as a thermally insulated chamber comprising a closable door for direct access into the reagent chamber 150. Various possibilities of interior fittings of the reagent chamber 150 of the embodiments of FIGS. 1 and 2 will be discussed further below in connection with the following Figures. The reagent chamber 150 comprises an opening 252 partly closed by a plug 272 for insulation reasons. A supply line 254 for supplying a reagent into the stage top chamber 210 extends from a reagent container through the plug 272 into the stage top chamber 210.

In the embodiment shown in FIG. 2, the reagent chamber 150 comprises another opening 112 working as a cable duct which can be used for e.g. power cords, trigger cables, and/or a connection to an external temperature control unit (as will be explained further below in connection with the following Figures). This opening 112 may also be partly closed by another plug comprising through holes for the corresponding cables etc.

It should be noted that FIGS. 1 and 2 show the basic principles of the two alternatives of possible arrangements of the integrated reagent chamber within the microscope housing, while the following Figures will more focus on possible interior fittings as well as on the temperature control of the reagent chamber 150 itself. It should be noted that the following embodiments can be combined with each alternative embodiment shown in FIG. 1 or in FIG. 2.

Figure 3:
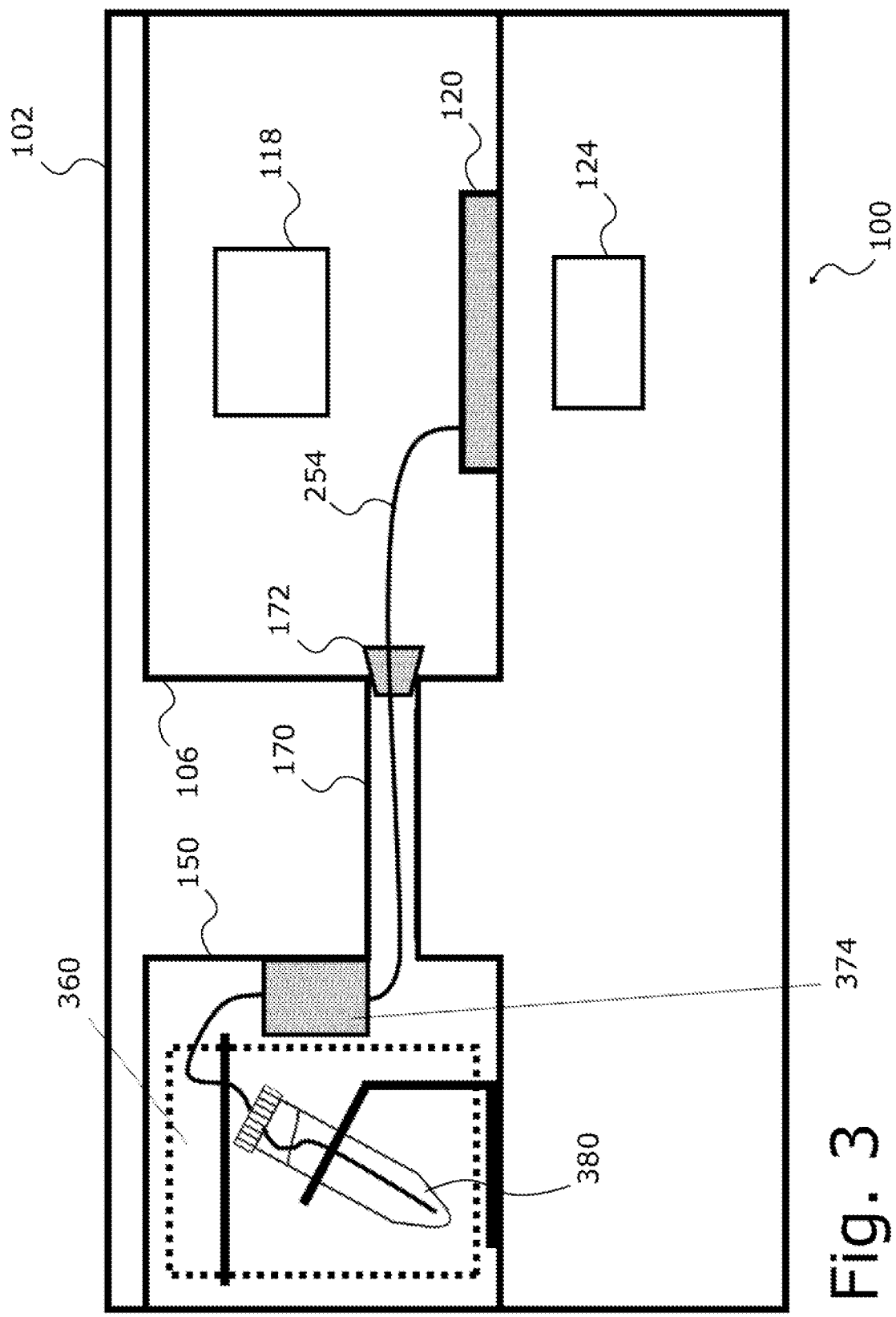
FIG. 3 schematically shows a further embodiment of a microscope including a reagent chamber located outside the sample chamber of the microscope.

FIG. 3 shows another embodiment of a microscope according to the present inventive concept in the alternative corresponding to FIG. 1 as discussed above. Thus, only the differences in regard to FIG. 1 are discussed for reasons of conciseness.

The reagent chamber 150 in FIG. 3 comprises a reagent container 380 in the form of a Falcon tube, a pump system 374 in the form of a perfusor or syringe pump, and a reagent supply line 254. A coolpack 360 as a cooling unit is arranged at the backside of the reagent chamber 150. This allows to maintain a temperature below ambient temperature within the insulated reagent chamber 150. The cooled reagent can be conveyed by the perfusor 374 from the Falcon tube 380 to the sample 120 through the supply line 254.

Figure 4:
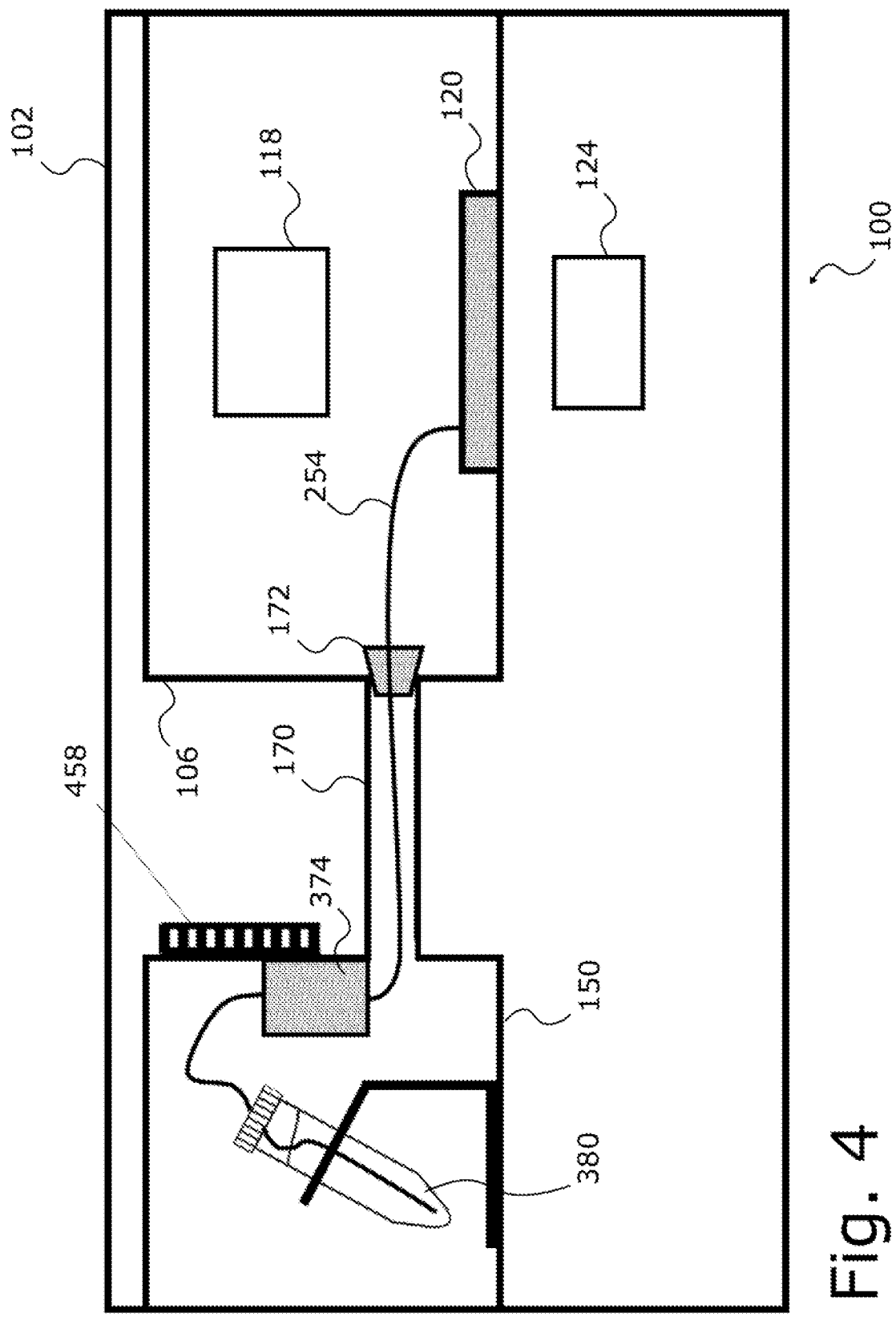
FIG. 4 schematically shows a further embodiment of a microscope including a reagent chamber located outside the sample chamber of the microscope.

FIG. 4 shows a slightly different embodiment of the embodiment in FIG. 3. Instead of a coolpack 350, a Peltier element 458 is installed at or into the outer wall of the reagent chamber 150 for cooling or heating the inside of the reagent chamber 150. Such a Peltier element 458 can easily be used for controlling the temperature within the reagent chamber 150 to a desired temperature by use of corresponding temperature sensors within the reagent chamber.

Figure 5:
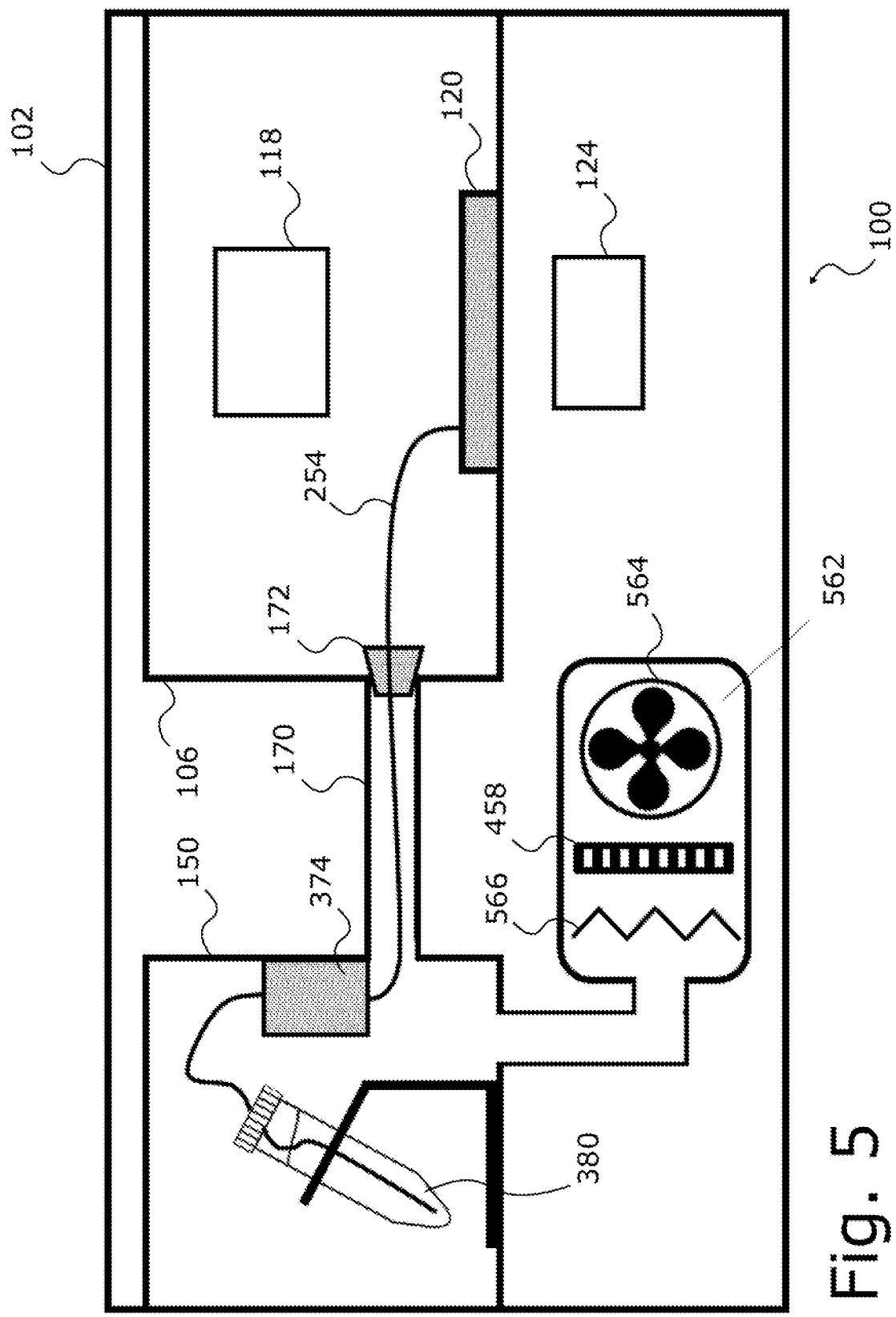
FIG. 5 schematically shows a further embodiment of a microscope including a reagent chamber and a temperature control unit, both located outside the sample chamber of the microscope.

FIG. 5 shows another embodiment of a reagent chamber 150 which is connected to a temperature control unit 562. Apart from that, the embodiment of FIG. 5 corresponds to the embodiments of FIGS. 3 and 4. Instead of having a coolpack 360 or a Peltier element 458, the temperature in the reagent chamber 150 is controlled by connecting a temperature control unit 562 to the reagent chamber 150. The temperature control unit 562 comprises a fan 564, a Peltier element 458 and a heating unit 566. Instead of the heating unit 566 a heat exchanging unit can be used. It should be noted that, depending on the kind of experiment, it might be sufficient to only use a Peltier element 458 or only a heater 566 or a heat exchanging unit. Again, the Peltier element 458 is used for heating or cooling the temperature inside the temperature control unit 562. Air is circulated by fan 564 such that a uniform temperature inside the temperature control unit 562 and the reagent chamber 150 is achieved. The heater 566 can support the Peltier element 458 to more rapidly achieving higher temperatures if necessary.

Figure 6:
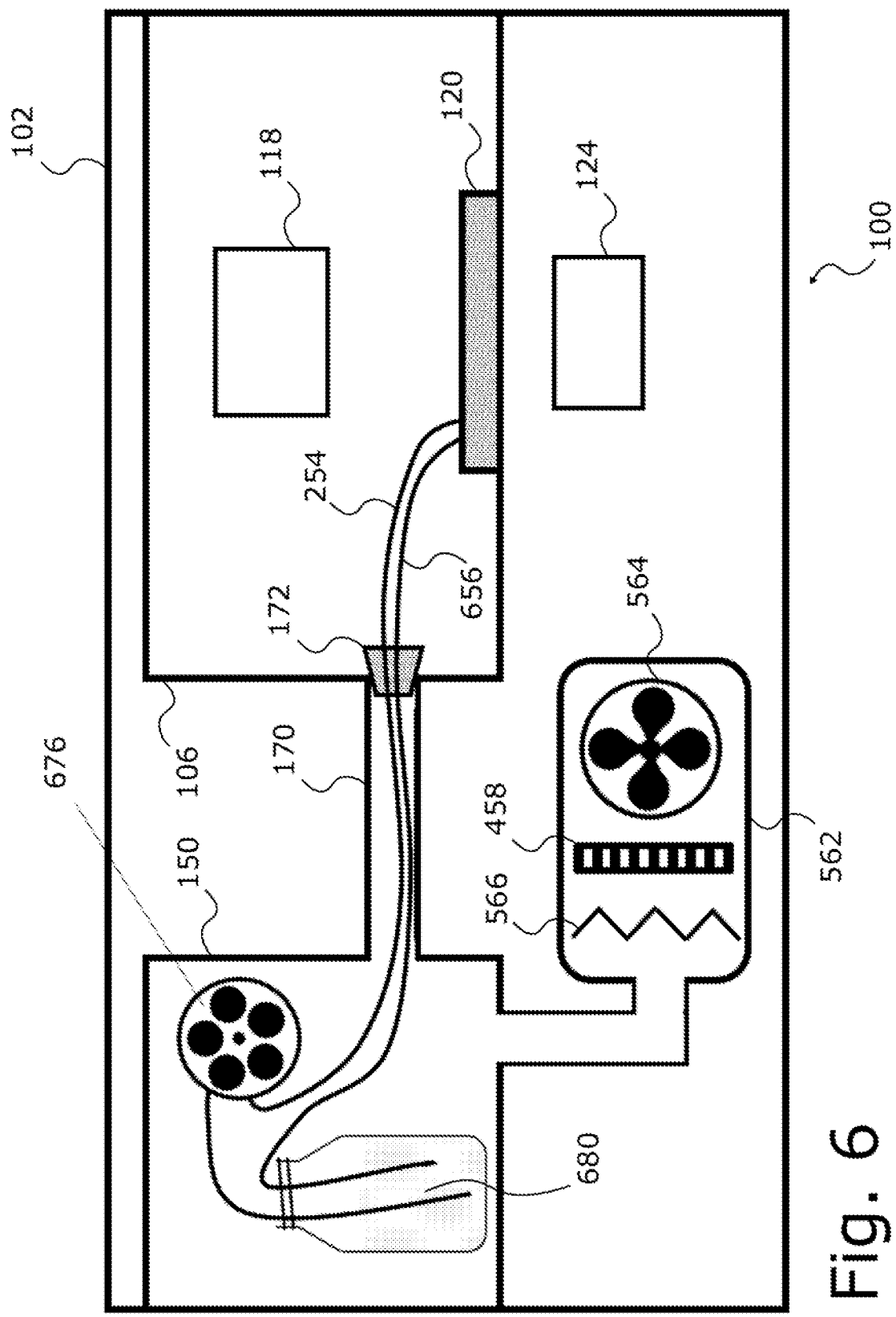
FIG. 6 schematically shows a further embodiment of a microscope including a reagent chamber and a temperature control unit, both located outside the sample chamber of the microscope.

The embodiment of FIG. 6 essentially corresponds to the one of FIG. 5 with the difference that instead of the Falcon tube 380 a Schott flask 680 is used as a reagent container. Instead of using a perfusor, a peristaltic pump 676 is used. Peristaltic pumps are typically used in experiments, like organ-on-a-chip experiments, where a reagent has to be supplied continuously to a sample while, at the same time, reagent is removed from the sample. As shown in FIG. 6, reagent is conveyed through a reagent supply line 254 from the Schott flask 680 via the peristaltic pump 676 through the connecting tube 170 and the plug 172 to the sample 120. At the same time, reagent is removed from the sample 120 via reagent removal line 656. The removed reagent is transported back into the same or a second Schott flask 680 or another container.

It should be noted that this kind of embodiment can also be implemented in an embodiment shown in FIG. 3 or 4 without having an external temperature control unit. Any of the embodiments described in connection with FIGS. 3 to 7 can also be implemented in a reagent chamber 150 as shown in FIG. 2, namely a reagent chamber 150 integrated into the sample chamber 106.

Figure 7:
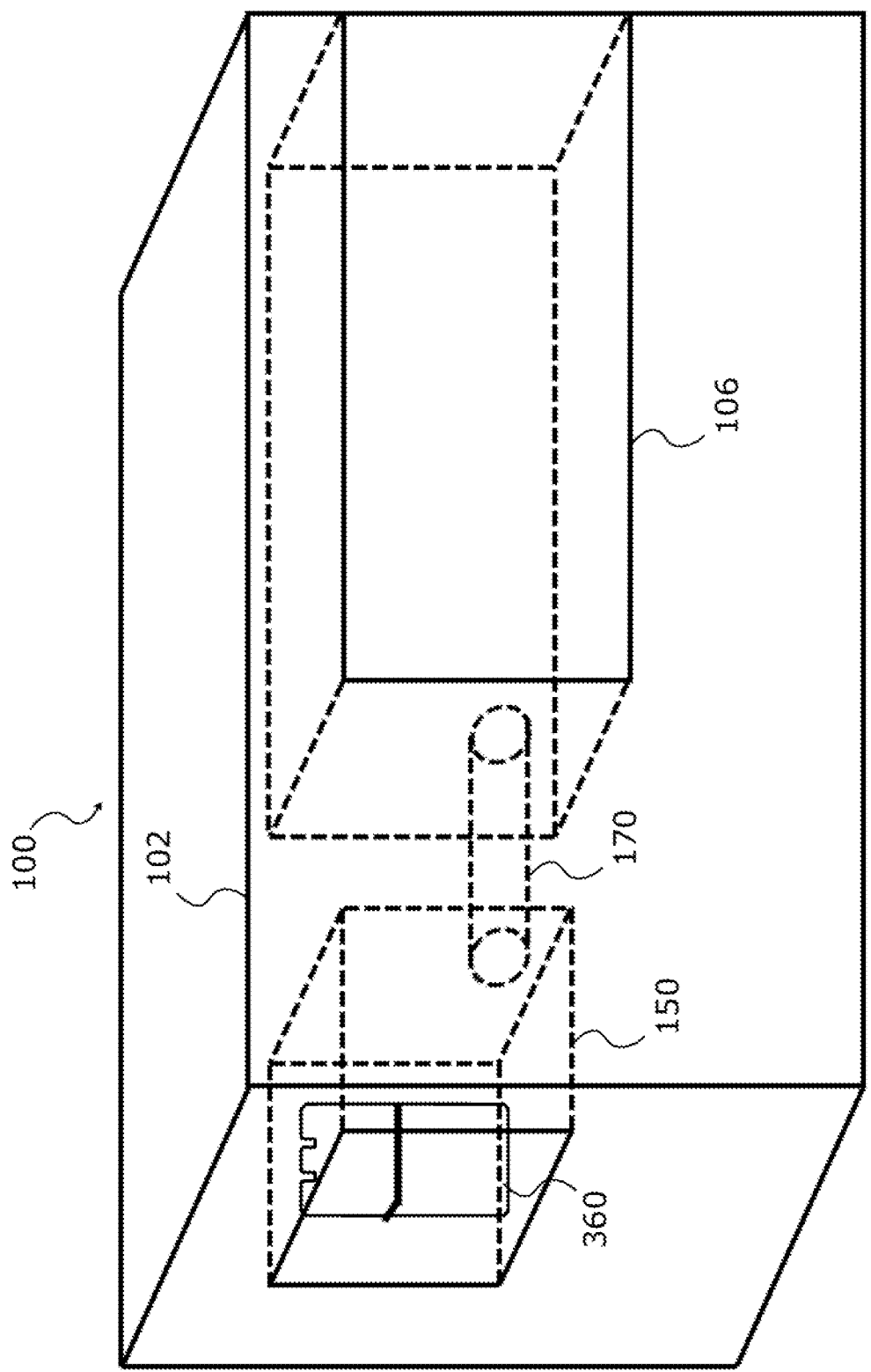
FIG. 7 schematically shows a further embodiment of a microscope including a reagent chamber located outside the sample chamber of the microscope.

FIG. 7 essentially corresponds to FIG. 3 and is only intended to illustrate the coolpack 360 at the backside of the reagent chamber 150. Regarding other details, reference is made to FIG. 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Microscope
102 Microscope housing
104 Housing section
106 Sample chamber
112 Cable duct
116 Microscope stage
118 Illumination optics
120 Sample
124 Imaging optics
150 Reagent chamber
152 Door
170 Connecting tube
172 Plug
210 Stage top chamber
252 Opening
254 Reagent supply line
272 Plug
360 Coolpack
380 Reagent container, Falcon tube
458 Peltier element
562 Temperature control unit
564 Fan
566 Heating unit, heater
656 Reagent removal line
676 Peristaltic pump
680 Reagent container, Schott flask

What is claimed is:
1. A microscope for microscopic examination of a sample, comprising:
   a microscope housing enclosing an illumination optics, a microscope stage, and an imaging optics;
   an integrated sample chamber located within the microscope housing; and an integrated reagent chamber located within the microscope housing, the integrated reagent chamber being configured to supply a reagent to the sample, wherein the reagent chamber is temperature controlled.

2. The microscope of claim 1, wherein the reagent chamber is located outside the sample chamber and comprises a connecting tube connecting the reagent chamber with the sample chamber.

3. The microscope of claim 2, wherein the connecting tube comprises, at a first tube end thereof, a plug at configured to at least partly close the first tube end.

4. The microscope of claim 1, wherein the reagent chamber is located within the sample chamber.

5. The microscope of claim 4, wherein the reagent chamber comprises an opening at least partly closed by a plug.

6. The microscope of claim 1, wherein the reagent chamber is at least one of thermally insulated and light protected.

7. The microscope of claim 1, wherein the reagent chamber comprises at least one of a cooling unit, a heating unit, and a heat exchanging unit.

8. The microscope of claim 1, wherein the reagent chamber comprises a Peltier element.

9. The microscope of claim 1, wherein the reagent chamber comprises a coolpack.

10. The microscope of claim 1, wherein the reagent chamber is connected to a temperature control unit configured to control a temperature inside the reagent chamber.

11. The microscope of claim 10, wherein the temperature control unit comprises at least one of a fan, a cooling unit, a heating unit, and a heat exchanging unit.

12. The microscope of claim 3, wherein the reagent chamber is configured such that at least one reagent container is installable in the reagent chamber.

13. The microscope of claim 12, wherein the reagent chamber is configured such that at least one of a reagent supply line and a reagent removal line are connectable to one of the least one reagent container.

14. The microscope of claim 13, wherein the plug is configured to duct the at least one of the reagent supply line and the reagent removal line through the plug.

15. The microscope of claim 13, wherein the reagent chamber comprises a pump system configured to convey reagent through the reagent supply line and/or the reagent removal line.

16. The microscope of claim 1, wherein the reagent chamber comprises a door configured to provide access into the reagent chamber.

* * * * *